United States Patent
Luo et al.

(10) Patent No.: US 7,436,149 B2
(45) Date of Patent: Oct. 14, 2008

(54) SYSTEMS AND METHODS FOR INTERFACING A BATTERY-POWERED INFORMATION HANDLING SYSTEM WITH A BATTERY PACK OF A PHYSICALLY SEPARABLE BATTERY-POWERED INPUT OR INPUT/OUTPUT DEVICE

(75) Inventors: Shiguo Luo, Austin, TX (US); John J. Breen, Harker Heights, TX (US); Mohammed K. Hijazi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 58 days.

(21) Appl. No.: 11/527,126

(22) Filed: Sep. 26, 2006

(65) Prior Publication Data

US 2008/0074080 A1 Mar. 27, 2008

(51) Int. Cl.
*H01M 10/46* (2006.01)
(52) U.S. Cl. ...................................... 320/115
(58) Field of Classification Search ................. 320/103, 320/107, 112, 114, 115, 116, 138
See application file for complete search history.

(56) References Cited

U.S. PATENT DOCUMENTS

| | | | |
|---|---|---|---|
| 5,196,780 A | 3/1993 | Pacholok |
| 5,200,690 A | 4/1993 | Uchida |
| 5,248,928 A | 9/1993 | Gilmore |
| 5,420,493 A | 5/1995 | Hargadon et al. |
| 5,440,502 A | 8/1995 | Register |
| 5,512,813 A | 4/1996 | Uchinami |
| 5,523,671 A | 6/1996 | Stewart |
| 5,528,122 A | 6/1996 | Sullivan et al. |
| 5,561,361 A | 10/1996 | Sengupta et al. |
| 5,576,609 A | 11/1996 | Brown et al. |

(Continued)

FOREIGN PATENT DOCUMENTS

CN 1531163 A 1/2004

(Continued)

OTHER PUBLICATIONS

Copending Application entitled "Power Architecture For Battery Powered Remote Devices", filed Feb. 22, 2007, U.S. Appl. No. 11/709,675, 28 pgs.

(Continued)

*Primary Examiner*—Edward Tso
(74) *Attorney, Agent, or Firm*—O'Keefe, Egan, Peterman & Enders LLP (57) ABSTRACT

Systems and methods for interfacing a battery system of a battery-powered keyboard system with main battery components of a battery-powered information handling system to enable a battery charging system of the battery-powered information handling system to charge both the main battery pack of the battery-powered information handling system and the battery pack of the battery-powered keyboard system without the presence of a separate stand-alone battery charger in the battery-powered keyboard system, and/or so that the keyboard battery of the battery-powered keyboard system may be used to supplement the main battery of the battery-powered information handling system such as in case of emergency power loss or to extend total battery life for running the information handling system.

28 Claims, 5 Drawing Sheets

U.S. PATENT DOCUMENTS

| | | |
|---|---|---|
| 5,659,239 A | 8/1997 | Sanchez et al. |
| 5,708,348 A | 1/1998 | Frey et al. |
| 5,726,554 A | 3/1998 | Freiman et al. |
| 5,764,035 A | 6/1998 | Lee |
| 5,847,546 A | 12/1998 | Sengupta et al. |
| 5,945,811 A | 8/1999 | Hasegawa et al. |
| 6,064,179 A | 5/2000 | Ito et al. |
| 6,075,343 A | 6/2000 | Hsu |
| 6,137,265 A | 10/2000 | Cummings et al. |
| 6,154,012 A | 11/2000 | Drori |
| 6,172,480 B1 | 1/2001 | Vandelac |
| 6,208,117 B1 | 3/2001 | Hibi |
| 6,254,832 B1 | 7/2001 | Rainin et al. |
| 6,377,028 B1 | 4/2002 | Armstrong, II et al. |
| 6,380,712 B2 | 4/2002 | Murphy et al. |
| 6,476,585 B1 | 11/2002 | Simmonds |
| 6,498,458 B1 | 12/2002 | Chen |
| 6,501,249 B1 | 12/2002 | Drori |
| 6,873,135 B2 | 3/2005 | Nakatsuji |
| 7,391,184 B2 | 6/2008 | Luo et al. |
| 2001/0035733 A1 | 11/2001 | Murphy et al. |
| 2001/0048288 A1 | 12/2001 | Hebding et al. |
| 2002/0195996 A1 | 12/2002 | Nakatsuji |
| 2003/0178967 A1* | 9/2003 | Khatri ................... 320/103 |
| 2004/0012368 A1* | 1/2004 | Massey et al. ........... 320/103 |
| 2004/0164706 A1 | 8/2004 | Osborne |
| 2004/0164708 A1 | 8/2004 | Veselic et al. |
| 2004/0178766 A1 | 9/2004 | Bucur et al. |
| 2004/0195996 A1 | 10/2004 | Nishida |
| 2005/0024016 A1 | 2/2005 | Breen et al. |
| 2005/0112457 A1 | 5/2005 | Breen et al. |
| 2005/0162123 A1* | 7/2005 | Sawyers ................. 320/103 |
| 2006/0022633 A1 | 2/2006 | Nguyen |
| 2006/0152194 A1 | 7/2006 | Wang et al. |
| 2006/0181244 A1 | 8/2006 | Luo et al. |

FOREIGN PATENT DOCUMENTS

| | | |
|---|---|---|
| EP | 1037358 A1 | 9/2000 |
| GB | 2183944 A | 6/1987 |
| GB | 2246916 A | 2/1992 |
| GB | 2358299 A | 7/2001 |
| GB | 2359945 A | 9/2001 |
| JP | 07-298504 | 11/1995 |
| JP | 08106922 A | 4/1996 |
| JP | 08140281 A | 5/1996 |
| JP | 9233727 | 9/1997 |
| JP | 10051962 | 2/1998 |
| JP | 10-075540 | 3/1998 |
| JP | 10-304589 | 11/1998 |
| JP | 11262197 A | 9/1999 |
| JP | 2002017052 A | 1/2002 |
| JP | 2002-281660 | 9/2002 |
| JP | 2003087990 A | 3/2003 |
| JP | 2003-142162 | 5/2003 |
| WO | WO99/09635 | 2/1999 |
| WO | WO2004/075371 A1 | 9/2004 |
| WO | WO2005/084343 A2 | 9/2005 |

OTHER PUBLICATIONS

Co-Pending Application Entitled "AC-DC Adapter And Battery Charger Integration Scheme", U.S. Appl. No. 10/628,921, filed Jul. 29, 2003, 25 pgs.

Co-Pending Application Entitled "Systems And Methods For Regulating Pre-Charge Current In A Battery System", U.S. Appl. No. 11/034,624, filed Jan. 13, 2005, 26 pgs.

Co-Pending Application Entitled "Systems and Methods For Integration Of Charger Regulation Within A Battery System", U.S. Appl. No. 11/058,781, filed Feb. 16, 2005, 30 pgs.

Microchip, Pic12F629/675 Data Sheet, 8-Pin Flash-Based 8-Bit CMOS Microcontrollers, 2003, 132 pgs.

* cited by examiner

FIG. 4

SYSTEMS AND METHODS FOR INTERFACING A BATTERY-POWERED INFORMATION HANDLING SYSTEM WITH A BATTERY PACK OF A PHYSICALLY SEPARABLE BATTERY-POWERED INPUT OR INPUT/OUTPUT DEVICE

BACKGROUND OF THE INVENTION

1. Field of the Invention

This invention relates generally to battery systems, and more particularly to battery systems for information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may, include one or more computer systems, data storage systems, and networking systems.

Examples of portable information handling systems include notebook computers. These portable electronic devices are typically powered by battery systems such as lithium ion ("Li-ion") or nickel metal hydride ("NiMH") battery packs including one or more rechargeable batteries. Power requirements for notebook computers, especially "higher end" notebook computer systems, have increased with the use of more powerful central processing units (CPUs) and overall higher system performance requirements, thus requiring higher capacity battery packs to maintain the same system battery life. However, more stringent regulations are now being imposed on higher capacity batteries that increase shipping costs for such batteries. For example, current regulations impose requirements that raise shipping costs for batteries having capacities of greater than about 98 watt hours (Wh) or a lithium content of more than 8 grams for lithium ion battery chemistry. Yet additional costs may be required to comply with hazardous materials labeling requirements for higher capacity batteries.

In addition to increased shipping costs, higher capacity battery packs take up more space within a notebook computer than older lower capacity batteries. As a result, it is often difficult to design a large enough space within a notebook computer for placement of a battery pack holder for a higher capacity battery (e.g., a 16 cell battery). Besides mechanical size constraints, designs for such higher capacity battery packs is often constrained by limitations related to notebook computer mechanical form and operation concerns, notebook computer profile/outline, etc. System thermal design issues must also be addressed when higher capacity packs are placed within a notebook computer.

SUMMARY OF THE INVENTION

Disclosed herein are systems and methods for interfacing a battery system of a battery-powered keyboard (e.g., wireless keyboard) with components of a main battery system of a battery-powered information handling system (e.g., portable information handling system such as notebook computer system). In one embodiment, the disclosed systems and methods may be implemented to provide a new power architecture that leverages and enables a battery charging system of a battery-powered information handling system so that it is capable of charging both the main battery pack of the information handling system, and a battery pack of a battery-powered keyboard system without the presence of a separate stand-alone battery charger in the battery-powered keyboard system. In another embodiment, the disclosed systems and methods may be implemented so that the battery of a battery-powered keyboard system may be used to supplement the main battery of a battery-powered information handling system, e.g., in case of emergency power loss or to extend total battery life for running the battery-powered information handling system.

In yet another embodiment, a communication scheme may be provided between control component/s of the battery-powered keyboard system and control component/s of the battery-powered information handling system. When a battery-powered information handling system and/or battery-powered keyboard system are provided with smart battery packs capable of providing battery charge state or other battery information, communication between the smart battery pack/s and control component/s of the battery-powered keyboard system and/or control component/s of the battery-powered information handling system may be provided.

In one embodiment, a power architecture may be provided that enables a keyboard battery system to provide power to supplement a non-keyboard battery system (e.g., main battery system) of an information handling system, such as a portable information handling system. In such an embodiment, one or more benefits may be achieved, including providing a battery backup and/or uninterruptible power supply (UPS) for preventing data loss in case of main battery pack failure emergency that is not possible with conventional portable information handling systems (e.g. notebook computers) that are configured with higher capacity main system battery packs.

In addition, it is also possible to utilize the disclosed systems and methods to realize significant extension of total information handling system battery life (e.g., by over 30%) from the combination of main battery pack and keyboard battery pack. Design flexibility may be advantageously provided that allows optimization of the battery pack size/capacity for both a wireless keyboard battery pack and a main battery pack (i.e., relative size/capacity of each battery pack may be varied to meet design criteria while maintaining the same total information handling system battery life since the total information handling system battery life is a function of the sum of the keyboard battery pack capacity and the main battery pack capacity). Because total information handling system battery life is not dependent only on the capacity of the main battery system but is shared between main battery pack and keyboard battery pack, the size of the main battery pack may be reduced in way that maintains or increases the total information handling system battery life but at the same time reduces the battery pack transportation fees related to regulatory limits imposed on large battery packs, i.e., such as imposed by CFR49 requirements.

In another embodiment, a communication scheme may be provided between control component/s of the wireless keyboard system, control component/s of an information handling system, and main system and keyboard smart battery packs. The benefits that may be achieved in the implementation of such an embodiment include, but are not limited to, allowing the main system battery monitoring components of the information handling system to monitor and manage charging and discharging status for both main battery pack/s and keyboard battery pack/s.

In yet another embodiment, the main battery charging system of an information handling system may be employed to charge battery cells of a keyboard battery system and battery cells of a main battery system of an information handling system. Such an embodiment advantageously makes possible total charger circuit cost reduction by eliminating the need for a second and separate stand-alone battery charger for the keyboard battery system. Thus, the disclosed systems and method may be implemented in a manner that addresses battery size regulatory requirements, while at the same time reducing costs and providing increased power/energy delivery capability. In a further exemplary embodiment, the same connector interface provided for connection of a keyboard battery system to a main battery system may be employed to connect an extra non-keyboard battery pack to the main battery system of the information handling system for charging. This proposal can span across other applications, for example, it will allow customers to charge extra battery pack by using same interface definition as wireless keyboard.

In one respect, disclosed herein is a battery-powered information handling system, including battery and charging circuitry configured to provide charge current to a main system battery pack of the battery powered information handling system. The battery and charging circuitry of the battery-powered information handling system may be configured to be coupled to a battery pack of a physically separable (i.e., detachable) battery-powered input or input/output device to allow a flow of current between the battery and charging circuitry and the battery pack of the physically separable battery-powered input or input/output device.

In another respect, disclosed herein is a portable information handling system, including: a main system smart battery pack coupled to provide current to a system load of the portable information handling system; a main charger regulator and controller coupled to provide charge current to the main system smart battery pack; battery interface control circuitry coupled to the main system smart battery pack and the main charger regulator and controller at a first node; and an auxiliary charger controller coupled to control the battery interface control circuitry. The auxiliary charger controller may also be coupled to monitor charge condition of the main system smart battery pack and charging operation of the main system main charger regulator and controller. The battery interface control circuitry may be further configured to be coupled between the first node and a smart battery pack of a wireless keyboard. The battery interface control circuitry may be configured to control current flow between the first node and the smart battery pack of the wireless keyboard.

In another respect, disclosed herein is a method of operating a battery-powered information handling system, including: coupling battery and charging circuitry of the battery-powered information handling system to a battery pack of a physically separable battery-powered input or input/output device, the battery and charging circuitry including a main battery pack of said battery-powered information handling system; and allowing a flow of current between the battery and charging circuitry and the battery pack of the physically separable battery-powered input or input/output device.

DESCRIPTION OF ILLUSTRATIVE EMBODIMENTS

Figure 1A:
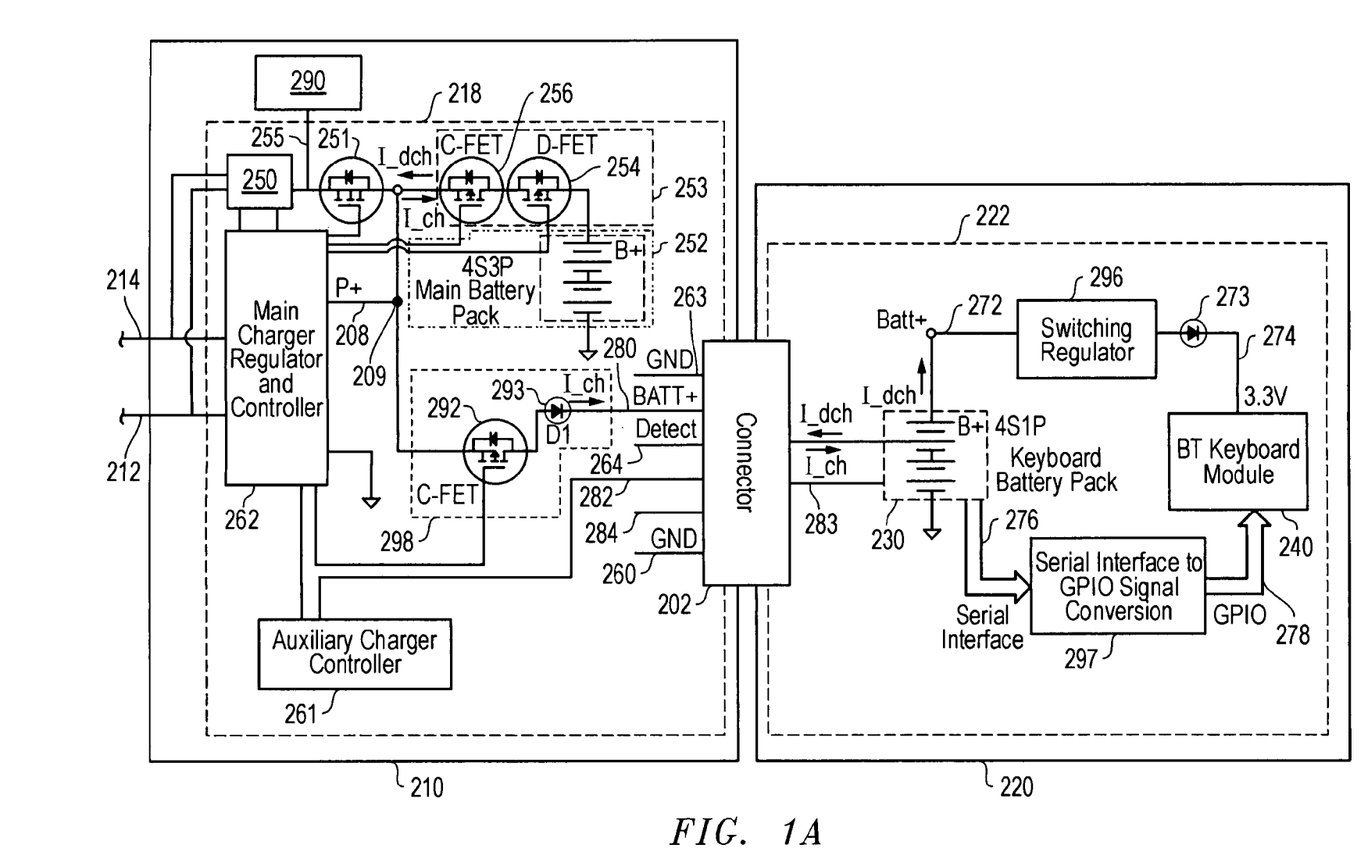
FIG. 1A is a block diagram of an information handling system coupled to a wireless keyboard system according to one embodiment of the disclosed systems and methods.
Figure 1B:
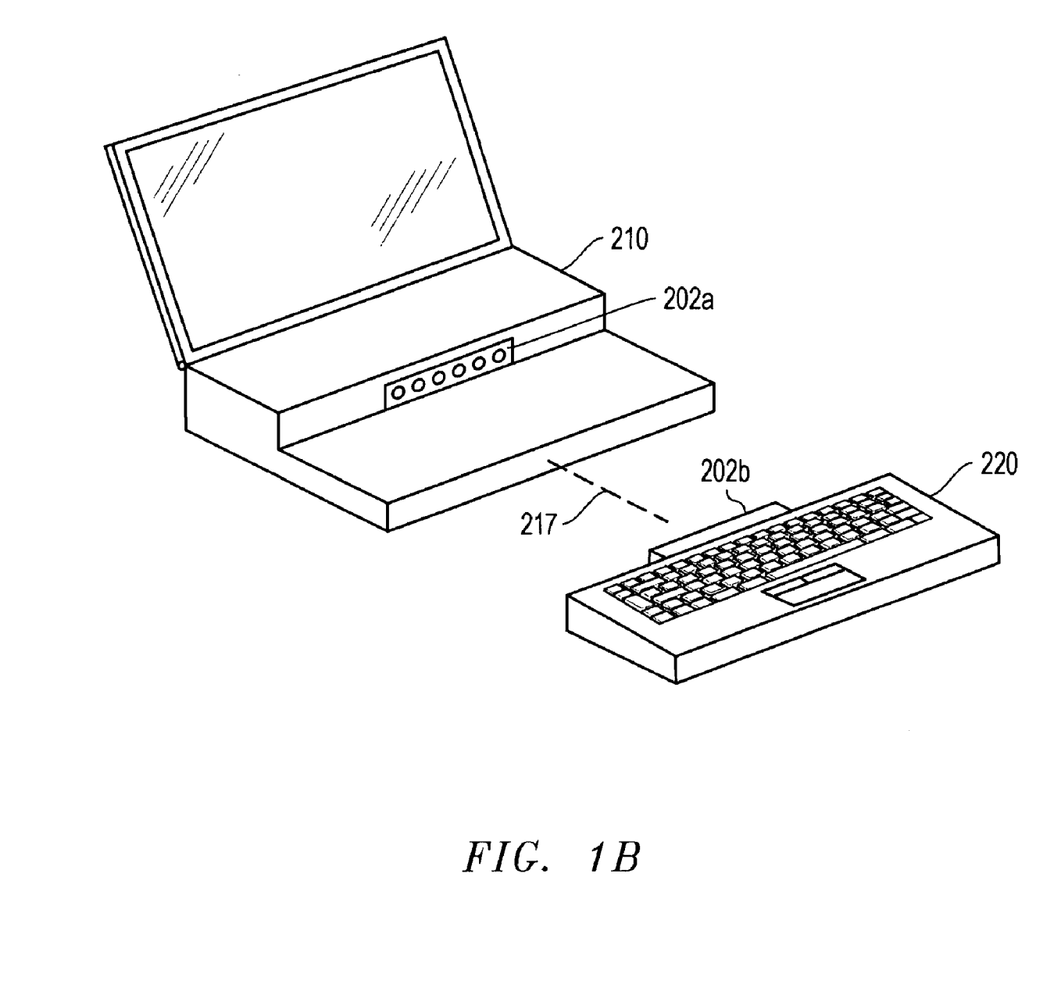
FIG. 1B is a simplified perspective view of an information handling system and physically separable wireless keyboard system according to one embodiment of the disclosed systems and methods.

FIG. 1A shows one exemplary embodiment of the disclosed systems and methods in which a physically separable input device in the form of a wireless keyboard system 220 (e.g., with QWERTY or any other keyboard configuration suitable for entry of data) having keyboard subsystem circuitry 222 as it may be removably coupled via connector 202 to battery and charging circuitry 218 of an information handling system 210, e.g., portable information handling system such as notebook computer system. As described below, wireless keyboard system 220 may be connected to information handling system 210 (e.g., notebook computer) 210 for providing supplemental power to system load 290 and/or for battery charging purposes. Connector 202 may be any connection apparatus suitable for temporarily coupling wireless keyboard system 220 to battery and charging circuitry 218 including, but not limited to, device to device (cableless) pin and connector mechanical interconnects, cable interconnects, etc. FIG. 1B shows an embodiment in which wireless keyboard system 220 is physically separable from an information handling system 210 (in the form of a notebook computer) at connector 202 (e.g., including connector halves 202a and 202b) so that wireless keyboard 220 is capable of remote operation while physically separated from information handling system 210 via wireless communication link 217 with information handling system 210, as shown in FIG. 1B.

In the embodiment of FIG. 1A, wireless keyboard system 220 may be configured as a stand-alone wireless keyboard (e.g., having QWERTY or any other keyboard configuration suitable for entry of data) that is capable of short range wireless communication with information handling system 210 when connected or disconnected from information handling system 210. Wireless keyboard system 220 may communicate wirelessly with information handling system 210 using any suitable wireless medium including, but not limited to, radio frequency (e.g., Bluetooth) medium, optical (e.g., infrared) medium, etc. Although a wireless keyboard system is described and illustrated with respect to FIG. 1A, it will be understood that other physically separable input and input/output (I/O) devices (e.g., wireless game port, wireless storage module) may be similarly configured with a battery system in a manner for interfacing with battery and charging circuitry of an information handling system as described elsewhere herein.

Still referring to FIG. 1A, keyboard subsystem circuitry 222 of wireless keyboard includes a keyboard battery pack 230 (e.g., smart battery pack system capable of sensing and providing voltage information or other information about its own operating condition) for powering other circuitry of wireless keyboard system 220 that in this embodiment includes Bluetooth-keyboard controller module 240. In one embodiment, keyboard subsystem circuitry may include an optional communication interface to communicate control signals and to enable communication between a keyboard battery pack and a keyboard controller module. Such a communication interface may be provided in the form of a digital communication interface, e.g., System Management Bus (SMBus), I2C, Single Wire etc. For example, in the illustrated embodiment of FIG. 1A, a communication interface is shown provided in the form of serial interface signal path 276, serial interface to General Purpose Input/Output (GPIO) signal conversion 297, and GPIO signal path 278. In this exemplary embodiment, serial interface signal path 276 is coupled as shown to communicate control signals and to enable communication between keyboard battery pack 230 and Bluetooth-keyboard controller module 240 as shown, e.g., to enable keyboard battery pack 230 to provide information related to charge state and operating condition of keyboard battery pack 230 to Bluetooth-keyboard controller module 240. In one exemplary embodiment, communications between Bluetooth-keyboard controller module 240, auxiliary charger controller 261, main system battery pack 252 and keyboard battery pack 230 may also be enabled by keyboard controller 240 for accomplishing one or more of the control and/or monitoring features described elsewhere herein. Further, main system battery pack 252 and keyboard battery pack 230 may both be provided as smart battery pack systems in one embodiment to further enable features of the disclosed systems and methods.

Figure 4:
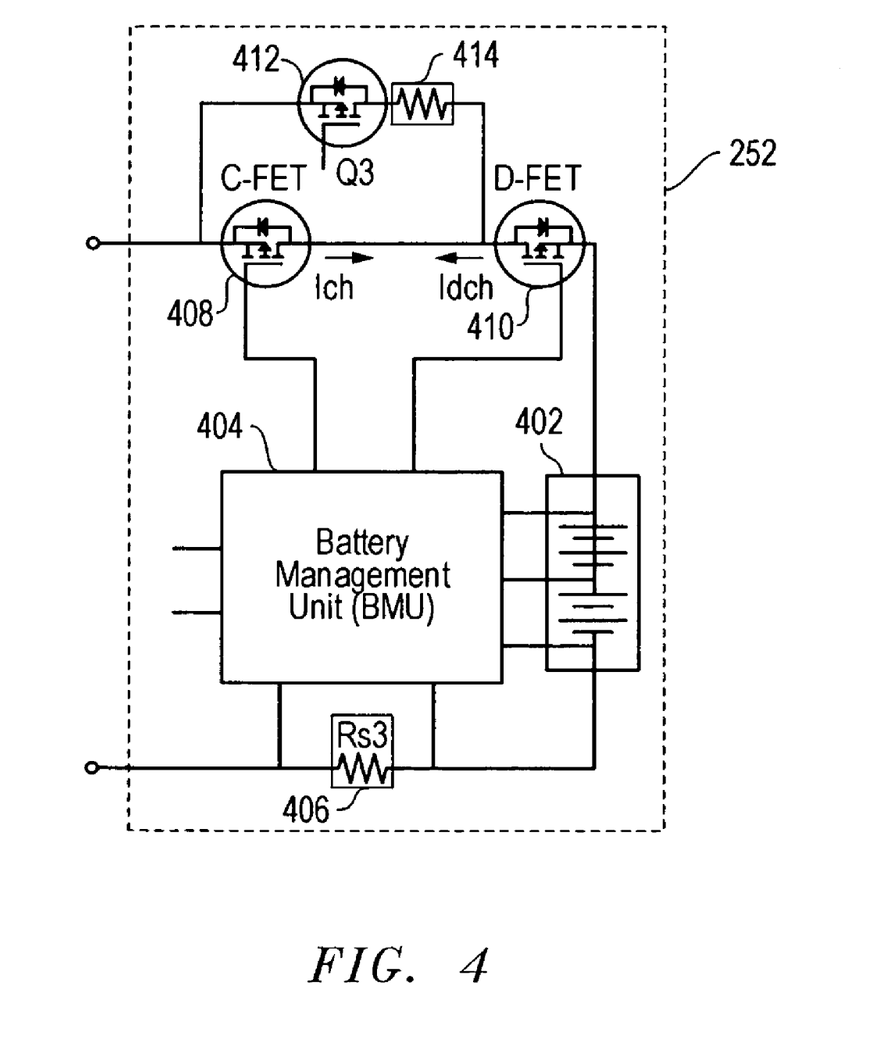
FIG. 4 is a simplified block diagram of a main system battery pack according to one embodiment of the disclosed systems and methods.

FIG. 4 shows one exemplary embodiment of main system battery pack 252 that includes battery cell/s 402, e.g., any type of rechargeable battery cell/s or combination thereof including, but are not limited to, Li-ion battery cells, NiMH battery cells, nickel cadmium (NiCd) battery cells, lithium-polymer (Li-polymer) battery cells, etc. As shown, battery pack 252 includes battery management unit ("BMU") 404 that is responsible for monitoring battery system operation and for controlling battery system charge and discharge components in the form of charge FET 408 and discharge FET 410. A current sense resistor 406 is present in the battery pack circuitry to allow BMU 404 to monitor charging current to the battery cell/s. During normal battery pack operations both charge and discharge FET switching elements 408 and 410 are placed in the closed state by BMU 404, which monitors voltage of battery cell/s 402. If BMU 404 detects a battery over-voltage condition, BMU 404 opens the charge FET switching element 408 to prevent further charging of the battery cell/s until the over-voltage condition is no longer present. Similarly, if BMU 404 detects a battery under-voltage (or over-discharge) condition, BMU 404 opens the discharge FET switching element 410 to prevent further discharging of the battery cell/s until the under-voltage condition is no longer present.

Also shown present in FIG. 4 is pre-charge circuitry that is present to pre-charge battery cell/s 402 when battery cell/s 402 have been discharged to below a predetermined low voltage level and are not ready to receive their full charging current. As shown, this pre-charge circuitry includes MOSFET 412 (Q3) used as a switch, and a resistor 414 (Rs3) to limit the level of the pre-charge current to a much lower current value than the normal charging current provided by main charger regulator and controller 262. During pre-charging mode, BMU turns on MOSFET switch 412 and maintains charge FET switching element 408 in open state to limit the charging current provided to battery cell/s 402 to the lower pre-charge current level until voltage of battery cell/s 402 reaches the predetermined low voltage level. When voltage of battery cell/s 402 reaches the predetermined low voltage level, BMU 404 turns off MOSFET 412 and closes charge FET switching element 408 to allow the full charging current to be provided to battery cell/s 402.

Referring again to FIG. 1A, keyboard battery pack 230 may be provided in one embodiment with a charge voltage range that is compatible with the charge voltage range of main battery pack 252 of information handling system 210, and/or with a discharge voltage range that is compatible with the discharge voltage range of main battery pack 252 of information handling system 210. For example, keyboard battery pack 230 may be provided with a charge voltage range that is compatible with the charge voltage range of main battery pack 252 by configuring keyboard battery pack 230 to have a charge voltage range that is the same, substantially the same, or that at least partially overlaps with the charge voltage range of main battery pack 252 of information handling system 210. Similarly, keyboard battery pack 230 may be provided with a discharge voltage range that is compatible with the discharge voltage range of main battery pack 252 by configuring keyboard battery pack 230 to have a discharge voltage range that is the same, substantially the same, or that at least partially overlaps with the discharge voltage range of main battery pack 252 of information handling system 210. In another exemplary embodiment, keyboard battery pack 230 may be configured to have the same, or substantially the same, average operating voltage and maximum voltage as main battery pack 252 of information handling system 210.

For example, in the illustrated exemplary embodiment keyboard battery pack 230 includes a 4S1P 4-cell battery cell configuration that has an average operating voltage of about 14.8 volts, and a maximum voltage of about 17.2 volts (i.e., the same operating and maximum voltages as the 4S3P 12-cell battery cell configuration of main battery pack 252). In another embodiment a 4S1P 4-cell battery cell configuration may be configured with battery cells to provide a keyboard battery pack 230 having a voltage of about 3 volts per cell (total 4S1P battery pack of about 12 volts) to about 4.2 volts per cell voltage (total 4S1P battery pack of about 16.8 volts). However, it will be understood that 4S1P 4-cell battery cell configurations having battery cell voltages of less than about 3 volts per cell and greater than about 4.2 volts per cell are also possible. It will also be understood that in the practice of the disclosed systems and methods that it is not necessary that a keyboard battery pack have a charge voltage range that is compatible with a charge voltage range of a main battery pack of an information handling system, and/or that a keyboard battery pack have a discharge voltage range that is compatible with the discharge voltage range of a main battery pack of an information handling system.

The disclosed systems and methods may therefore be advantageously implemented to allow main charger regulator and controller 262 of battery and charging circuitry 218 to supply I_ch current of unalterered or substantially unaltered voltage (e.g., current of about 500 mAmps or up to the maximum allowable charge current as per the battery pack battery management unit BMU setting) to keyboard battery pack 230, without the presence of voltage modification circuitry therebetween (e.g., without the presence of stand-alone battery charger circuitry within keyboard subsystem 222 or the presence of pre-regulator circuitry within battery and charging circuitry 218).

Additionally or alternatively, the disclosed systems and methods may also be advantageously implemented to allow keyboard battery pack 230 to supply I_dch current of unaltered or substantially unaltered voltage (e.g., current of about 500 mAmps or up to the maximum allowable charge current as per the battery pack battery management unit BMU setting) to supplement main battery pack 252 for powering system load 290 of information handling system 210, and/or to power system load 290 in case of emergency, such as loss or failure of main battery pack 252. It will be understood that the disclosed systems and methods is not limited to 4S battery configurations, but may be implemented with a single battery cell or any other combination of multiple battery cells (e.g., having greater or less than four battery cells) coupled in serial and/or parallel configuration, e.g., 3S1P, 5S1P, 2S2P, 6S2P, etc.

In FIG. 1A, keyboard battery pack 230 is coupled to supply current to switching regulator 296, which serves the purpose of providing regulated 3.3V rail to the wireless keyboard module and the rest of the keyboard circuitry, and in turn supplies current 274 of fixed voltage (e.g., about 3.3 volts) to Bluetooth-keyboard controller module 240. When wireless keyboard system 220 is disconnected from notebook computer system 210, battery cells of keyboard battery pack 230 provide discharge current I_dch to other circuitry of wireless keyboard 120 which may include a system load of wireless keyboard system 120 that may include wireless keyboard components such as wireless transceiver circuitry (not shown), switching regulator 296 and Bluetooth-keyboard controller module 240. As represented by diode symbol 273, the current path from switching regulator 296 is one-way or unidirectional toward Bluetooth-keyboard controller module 240.

In the exemplary embodiment of FIG. 1A, battery and charging circuitry 218 of FIG. 1A includes a main system battery pack 252 (e.g., smart battery pack system) in a 4S3P 12-cell configuration that has a an average operating voltage of 14.8 volts and a maximum voltage of 17.2 volts, which are substantially the same as the operating and maximum voltages of keyboard battery pack 230. Also shown in FIG. 1A is main charger regulator and controller 262 that is coupled to receive current from current supply terminals 212, 214 (e.g., alternating current, or direct current from an input rail of an AC adapter), and to produce DC power (P+) as current 208 that is provided to main system battery pack 252 and battery interface control circuitry 298 that is coupled between main battery pack 252 and connector 202. As shown, battery interface control circuitry 298 is coupled to main system battery pack 252 and main charger regulator and controller 262 at node 209.

In FIG. 1A, main system battery pack 252 is also coupled to provide discharge current (I_dch) to a system load 290 (such as processor, display, I/O devices, Bluetooth transceiver) of notebook computer system 210. A power switch 251 is shown present in the system power bus 255 for blocking direct application of voltage from current supply terminals 212, 214 to battery terminals of main battery pack 252 when such voltage is present at current supply terminals 212, 214 (e.g., AC adapter is present and operating), but to instantly allow main battery pack 252 support system power bus 255 when voltage is absent at current supply terminals 212, 214 (e.g., AC adapter is not present or not operating). Auxiliary battery charger controller 261 is also present within battery and charging circuitry 218 for purposes that include controlling operation of main charger regulator and controller 262 and controlling flow and characteristics of current provided from main charger regulator and controller 262 to main system battery pack 252 and system load 290 based on operational status of main charger regulator and controller 262 and main system battery pack 252. Auxiliary charger controller 261 may be an analog controller with some digital functionality, and may be configured to communicate with a microcontroller of a battery management unit (BMU) (not shown) of main system battery pack 252 through system BIOS of notebook computer system 210. Also shown present are bus switches, sensor and control 250 that are coupled to main charger regulator and controller 262, adapter input rail 212, 214 and system power bus 254.

In the embodiment of FIG. 1A, main charger regulator and controller 262 is coupled to provide charge current (I_dch) to main system battery pack 252 through charge and discharge selector 253 that in this embodiment includes two field effect transistors ("FETs") 254 and 256 that are coupled in series between main charger regulator and controller 262 and battery pack 252. FET 256 is a charge FET (C-FET) switching element that is controlled to allow or disallow charge current (I_ch) to the battery cells of battery pack 252, and FET 254 is a discharge FET (D-FET) switching element that is controlled to allow or disallow discharge current (I_dch) from the battery cell/s 224. In this regard, FETs 254 and 256 may be controlled, for example, by battery management unit (BMU) of main system battery pack 252 (not shown) that may include microcontroller and analog front end ("AFE") circuitry. As shown, body diodes are present across the source and drain of each FET switching element, i.e., to conduct charge current to the battery cell/s when the discharge FET switching element 254 is open, and to conduct discharge current from the battery cell/s when the charge FET switching element 256 is open.

As shown in FIG. 1A, battery interface control circuitry 298 includes a charge FET (C-FET) switching element 292 that is controlled (e.g., controlled by the auxiliary charger controller 261) to allow or disallow charge current (I_ch) to the battery cells of keyboard battery pack 230 via battery +terminal and battery supply pin (Batt+) 280 of connector 202 when wireless keyboard system 220 is coupled via connector 202 to battery and charging circuitry 218. In this embodiment, optional body diode shown present across the source and drain of FET switching element 292 is not necessary and may be absent. Also shown present is diode 293 that is present within battery interface control circuitry 298 so that the current path from battery and charging circuitry 218 to keyboard battery pack 230 is one-way or unidirectional toward keyboard battery pack 230, i.e., so that no current is allowed to flow back from keyboard battery pack 230 to battery and charging circuitry 218 through connector 202. Other pins shown present at connector 202 include ground pins 260 and 263, keyboard connection detection pin 264 for providing signal to notebook computer system 210 indicating connection (e.g., docking) of wireless keyboard system 220 to notebook computer system 210, and keyboard control serial interface pins 282, 284 that are present to communicate data to the auxiliary charger controller 261 related to the charge condition of keyboard battery pack 230 that may be provided, for example, by battery pack 230 via data communication path 283. It will be understood that the particular configuration of components of battery interface control circuitry 298 is exemplary only, and that nay other configuration of components and circuitry may be employed that is suitable for controlling flow of charge and/or discharge current between information handling system 210 and wireless keyboard system 220 in a manner as described elsewhere herein.

Still referring to FIG. 1A, when wireless keyboard system 220 is coupled via connector 202 to battery and charging circuitry 218, C-FET 292 is initially open and charge condition (e.g., battery cell voltage) of keyboard battery pack 230 is detected and monitored by auxiliary charger controller 261. Upon detection that keyboard pack 230 requires charging (e.g., detection of battery cell undervoltage equal to or below a low voltage charging threshold voltage of about 3 Volts per cell), then C-FET 292 switching element is closed (e.g., by control signal received from auxiliary charger controller 261) so as to allow flow of current 208 via Batt+ pin 280 of connector 202 as charge current I_ch to keyboard battery pack 230. Upon detection that keyboard pack 230 is charged (e.g., detection of battery cell full voltage equal to or above a high voltage charged threshold voltage of about 4.2 Volts per cell), then C-FET switching element 292 is opened (e.g., by control signal received from the auxiliary charger controller 261) so as to terminate flow of current 208 via Batt+ pin 280 of connector 202 as charge current I_ch to keyboard battery pack 230.

It will be understood that C-FET switching element 292 of FIG. 1A may be controlled to charge keyboard battery pack 230 in any suitable charging manner (e.g., regular charge, trickle charge, pre-charge, etc.), and that C-FET switching element 292 may be controlled to charge keyboard battery pack 230 using any configuration of digital and/or analog circuitry suitable for monitoring charge condition of keyboard battery pack 230 and suitable for controlling flow of charge current to keyboard battery pack 230 from battery and charging circuitry 218 of information handling system 210. Further, C-FET switching element is just an example of one suitable switching element configuration for controlling flow of charge current to keyboard battery pack 230, it being understood that any other switching element configuration may be employed that may be suitably controlled to selectably allow flow of charge current to keyboard battery pack 230 from battery and charging circuitry 218 of information handling system 210.

In this exemplary embodiment, keyboard battery pack 230 is of substantially the same operating voltage as main battery pack 252, and the substantially unaltered voltage of current 208 from main charger regulator and controller 262 is satisfactory for charging keyboard battery pack 230. For example, in an exemplary embodiment where main battery pack 252 and keyboard battery pack 230 each have an average operating voltage of about 14.8 volts and a maximum voltage of about 17.2 volts, main charger regulator and controller 262 may provide current 208 having a voltage that may be anywhere between ranges referenced above for charging each of main battery pack 252 and keyboard battery pack 230, simultaneously or one battery pack at a time. When simultaneously charging main battery pack 252 and keyboard battery pack 230 in parallel, the keyboard controller 240 and/or auxiliary charger controller 261 may be employed to determine that the packs are at equal potential before turning both charge paths on.

Figure 2:
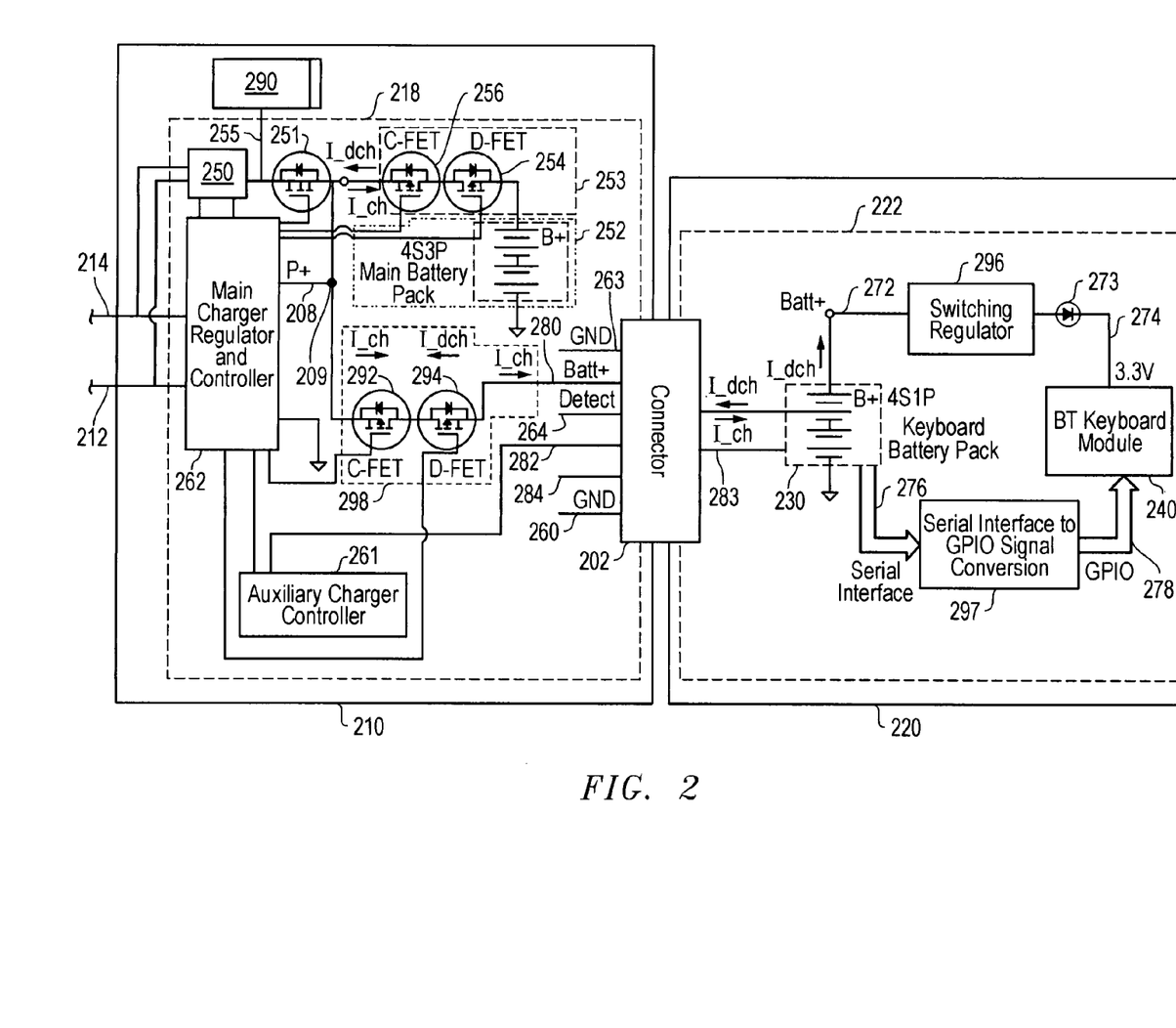
FIG. 2 is a block diagram of an information handling system coupled to a wireless keyboard system according to one embodiment of the disclosed systems and methods.

FIG. 2 shows another exemplary embodiment of the disclosed systems and methods in which battery interface control circuitry 298 includes previously-described charge FET (C-FET) switching element 292 in series with a discharge FET (D-FET) 294 that is controlled (e.g., controlled by auxiliary charger controller 261) to selectably allow or disallow flow of discharge current (I_dch) from the battery cells of keyboard battery pack 230 to battery and charging circuitry 218 via Batt+ pin 280 of connector 202 when wireless keyboard system 220 is coupled via connector 202 to battery and charging circuitry 218.

When wireless keyboard system 220 is coupled via connector 202 to battery and charging circuitry 218 of FIG. 2, both C-FET 292 and D-FET 294 are initially open and charge condition (e.g., battery cell voltage) of keyboard battery pack 230 is detected and monitored in a manner previously described. In this exemplary embodiment, D-FET 294 may be controlled in the same manner as C-FET 292 (e.g., by control signal received from auxiliary charger controller 261), to charge keyboard battery pack 230 upon detection that keyboard battery pack requires charging. As described for FIG. 2, upon detection that keyboard pack 230 requires charging, then C-FET 292 switching element is closed so as to allow flow of current 208 via Batt+ pin 280 of connector 202 as charge current I_ch to keyboard battery pack 230. Upon detection that keyboard pack 230 is charged, then C-FET switching element 292 is opened so as to terminate flow of current 208 via Batt+ pin 280 of connector 202 as charge current I_ch to keyboard battery pack 230.

Upon detection of a condition where keyboard battery pack 230 is sufficiently charged for supplying discharge current to battery and charging circuitry 218 (e.g., upon detection of battery cell voltage equal to or above a supplemental current supply threshold voltage of about 3 volts per cell), in combination with detection that main charger regulator and controller 262 is not supplying current 208 to main battery pack 252 and/or system load 290 (i.e., main charger regulator and controller 262 is in the "off" mode), then D-FET switching element 294 is closed so as to allow discharge current I_dch to flow from keyboard battery pack 230 to battery and charging circuitry 218 through Batt+ pin 280 and through battery interface control circuitry 298. In this exemplary embodiment, keyboard battery pack 230 supplies I_dch current of about 500mAmps (or up to the maximum allowable charge current as per the battery pack battery management unit BMU setting) under such conditions to supplement main battery pack 252 for powering system load 290 of information handling system 210, and/or to power system load 290 in case of emergency, such as loss or failure of main battery pack 252. When it is detected that keyboard battery pack 230 is not sufficiently charged for supplying discharge current to battery and charging circuitry 218 (e.g., upon detection of battery cell voltage below a supplemental current supply threshold voltage of about 3 volts per cell), and/or it is detected that main charger regulator and controller 262 is supplying current 208 to main battery pack 252 and/or system load 290 (i.e., main charger regulator and controller 262 is in the "on" mode), then D-FET switching element 294 is closed so as to allow discharge current I_dch to flow from keyboard battery pack 230 to battery and charging circuitry 218 through Batt+ pin 280 and through battery interface control circuitry 298.

It will be understood that D-FET switching element 294 of FIG. 2 may be controlled to supplement main battery pack 252 using any configuration of digital and/or analog circuitry suitable for monitoring charge condition of keyboard battery pack 230, detecting operating condition of main charger regulator and controller 262, and that is suitable for controlling flow of discharge current from keyboard battery pack 230 through battery interface control circuitry 298 to main battery pack 252 and/or system load 290. In one exemplary embodiment, D-FET switching element 294 may be optionally controlled to run in linear status(i.e.; so that voltage drop across D-FET 294 is proportional to drive voltage) to accommodate voltage differences between main battery pack 252 and keyboard battery pack 230 so as to facilitate the capability of keyboard battery pack 230 to supplement main battery pack 252, and/or to support components of system load 290 in case of emergency (e.g., loss or failure of main battery pack 252).

The architecture may also feature a communication scheme that is between the keyboard controller module, the main system charger controller, and the Battery Packs (e.g., smart battery packs 230 and 252) through a set of GPIOs and SMBus.

D-FET switching element 294 is just an example of one suitable switching element configuration for controlling flow of discharge current from keyboard battery pack 230 to information handling system 210, it being understood that any other switching element configuration may be employed that may be suitably controlled to selectably allow flow of discharge current to battery and charging circuitry 218 from keyboard battery pack 230.

Because keyboard battery pack 230 is of substantially the same operating voltage as main battery pack 252, the substantially unaltered voltage of discharge current I_dch from keyboard battery pack 230 is satisfactory for supplementing main battery pack 252 for powering system load 290 of information handling system 210. For example, in an exemplary embodiment where main battery pack 252 and keyboard battery pack 230 each have an average operating voltage of about 14.8 volts and a maximum voltage of about 17.2 volts, keyboard battery pack 230 may provide discharge current through Batt+ pin 208 that has a voltage of from about 3 volts per cell to about 4.2 volts per cell that is suitable for powering system load 290.

Figure 3:
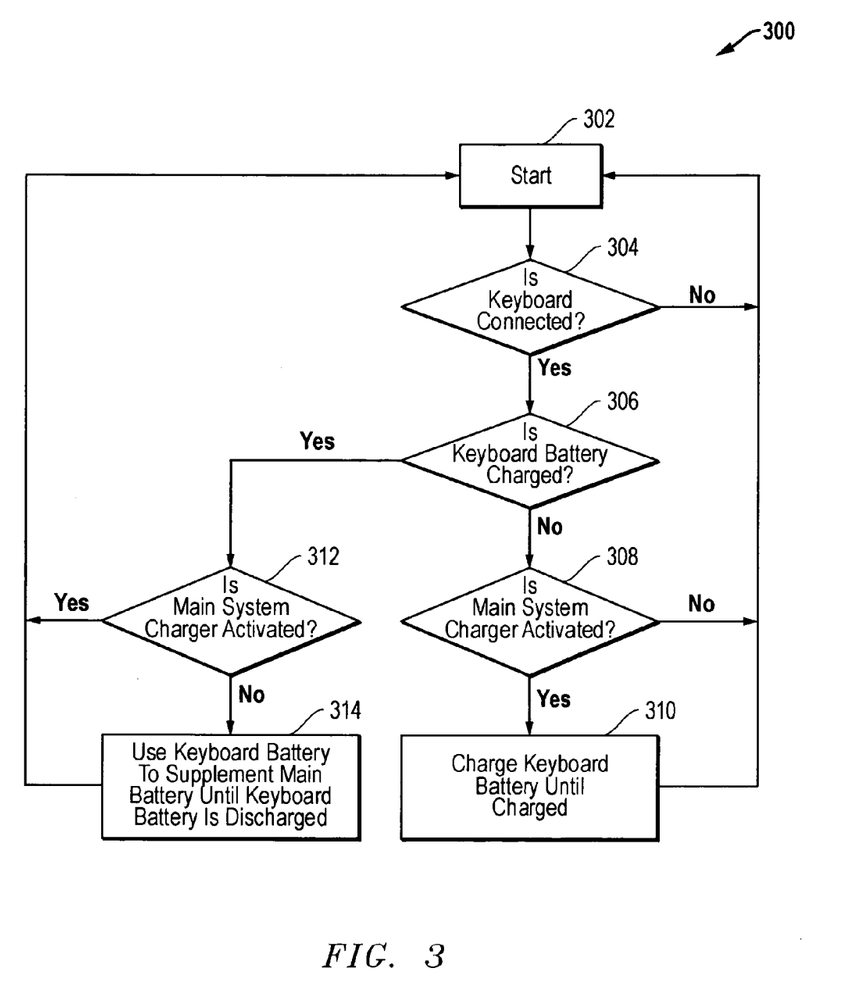
FIG. 3 is a flow chart of methodology that may be implemented according to one embodiment of the disclosed systems and methods.

FIG. 3 illustrates one exemplary embodiment of methodology 300 as it may be implemented in the practice of the disclosed systems and methods to interface keyboard subsystem circuitry of a wireless keyboard system (e.g., such as keyboard subsystem circuitry 218 of wireless keyboard system 220) with battery and charging circuitry 218 of an information handling system (e.g., information handling system 210) as illustrated in FIG. 2. Although described in relation to an exemplary embodiment including a wireless keyboard system, it will be understood that similar methodology may be implemented to interface a battery system of any other type of input or input/output device with a battery system of an information handling system as described elsewhere herein.

Methodology 300 starts in step 302 with no current flow existing between keyboard subsystem circuitry 222 and battery and charging circuitry 218. In the event that keyboard subsystem circuitry 222 is coupled to battery and charging circuitry 218 via connector 202, battery interface control circuitry 298 is controlled to allow no current to flow between keyboard subsystem circuitry 222 and battery and charging circuitry 218 until methodology 300 proceeds to following steps.

In step 304 of methodology 300, connection of keyboard subsystem circuitry 222 to battery and charging circuitry 218 via connector 202 is monitored. Step 304 repeats until such connection is detected, and then proceeds to step 306 where charge state of keyboard battery pack 230 is determined. If keyboard battery pack 230 is charged, methodology 300 proceeds to step 312. If main charger regulator and controller 262 is found to be activated in step 312, then methodology 300 proceeds back to step 302 and repeats without allowing current to flow between keyboard subsystem circuitry 222 and battery and charging circuitry 218. However, if main charger regulator and controller 262 is found in step 312 to not be activated, then battery interface control circuitry 298 is controlled to allow keyboard battery pack 230 to provide I_dch current via connector 202 to battery and charging circuitry 218 to supplement main system battery pack 252 until keyboard battery pack 230 is discharged, and the methodology repeats itself.

If it is determined in step 306 that keyboard battery pack 230 is not charged, then methodology 300 proceeds to step 308. If main charger regulator and controller 262 is found to be activated in step 308, then battery interface control circuitry 298 is controlled to allow battery and charging circuitry 218 to provide I_ch current via connector 202 to keyboard battery pack 230 until keyboard battery pack 230 is charged and the methodology repeats itself. If main charger regulator and controller 262 is found not to be activated in step 308, then methodology 300 proceeds back to step 302 and repeats without allowing current to flow between keyboard subsystem circuitry 222 and battery and charging circuitry 218. It will be understood that methodology 300 of FIG. 3 is exemplary only, and that additional, fewer or alternative steps are possible, and that the order of the given steps may be changed in any manner suitable for interfacing keyboard subsystem circuitry of a wireless keyboard system with battery and charging circuitry of an information handling system in a manner as disclosed herein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A battery-powered information handling system, comprising:
    a system load;
    a charger regulator that is configured to produce charge current from a current supply, said current supply comprising alternating current or direct current from an AC adapter; and
    battery and charging circuitry coupled to said charger regulator and configured to provide said charge current to a first battery pack that is a main system battery pack of said battery powered information handling system;
    wherein said battery and charging circuitry of said battery-powered information handling system is further configured to be coupled to a second battery pack that is a battery pack of a physically separable battery-powered input or input/output device to allow at least one of:
- a flow of said charge current produced by said charge regulator from said battery and charging circuitry to charge said second battery pack of said physically separable battery-powered input or input/output device, or
- a flow of discharge current from said second battery pack of said physically separable battery-powered input or input/output device to power said system load of said battery-powered information handling system, or
- a combination thereof.

2. The battery-powered information handling system of claim 1, wherein at least one of:
- said charge current flow from said battery and charging circuitry to charge said second battery pack of said battery-powered input or input/output device is of substantially unaltered voltage from the voltage of said charge current provided to said main system battery pack by said battery and charging circuitry, or
- said discharge current flow from said second battery pack of said battery-powered input or input/output device to power said system load of said battery-powered information handling system is of substantially unaltered voltage from a discharge current flow from said main system battery pack, or
- a combination thereof.

3. The battery-powered information handling system of claim 1, wherein said battery-powered input or input/output device comprises a battery-powered wireless keyboard; and wherein said battery-powered information handling system comprises a notebook computer.

4. The battery-powered information handling system of claim 1, wherein said battery and charging circuitry of said battery-powered information handling system is further configured to be coupled to a second battery pack that is a battery pack of a physically separable battery-powered input or input/output device to allow a flow of said charge current produced by said charge regulator from said battery and charging circuitry to charge said second battery pack of said physically separable battery-powered input or input/output device.

5. The battery-powered information handling system of claim 1, wherein said battery and charging circuitry of said battery-powered information handling system is further configured to be coupled to a second battery pack that is a battery pack of a physically separable battery-powered input or input/output device to allow a flow of discharge current from said second battery pack of said physically separable battery-powered input or input/output device to power said system load of said battery-powered information handling system.

6. The battery-powered information handling system of claim 4, wherein said battery and charging circuitry is configured to monitor a charge condition of said second battery pack of said physically separable battery-powered input or input/output device, and to control flow of said charge current from said battery and charging circuitry to said second battery pack of said physically separable battery-powered input or input/output device based at least in part upon said monitored charge condition of said second battery pack of said physically separable battery-powered input or input/output device.

7. The battery-powered information handling system of claim 5, wherein said battery and charging circuitry is configured to monitor battery charging operation of said battery and charging circuitry, and to control flow of said discharge current from said second battery pack of said physically separable battery-powered input or input/output device to power said system load of said battery-powered information handling system based at least in part upon said monitored battery charging operation of said battery and charging circuitry.

8. A portable information handling system, comprising:
- a first battery pack that is a main system smart battery pack coupled to provide current to a system load of said portable information handling system;
- a main charger regulator and controller coupled to provide charge current to said main system smart battery pack;
- battery interface control circuitry coupled to said main system smart battery pack and said main charger regulator and controller at a first node; and
- an auxiliary charger controller coupled to control said battery interface control circuitry, said auxiliary charger controller also being coupled to monitor charge condition of said main system smart battery pack and charging operation of said main charger regulator and controller;
- wherein said battery interface control circuitry is further configured to be coupled between said first node and a second smart battery pack that is a smart battery pack of a physically separable wireless keyboard;
- wherein said battery interface control circuitry is configured to control current flow between said first node and said second smart battery pack of said physically separable wireless keyboard.

9. The battery-powered information handling system of claim 8, wherein said battery-powered information handling system comprises a notebook computer system; wherein said notebook computer system further comprises said wireless keyboard; wherein said keyboard subsystem circuitry of said wireless keyboard is configured to be removably coupled to form a current path between said battery interface control circuitry and said second smart battery pack of said keyboard subsystem circuitry; and wherein there is no voltage modification circuitry present in said current path formed between said main charger regulator and controller and said second smart battery pack of said keyboard subsystem circuitry.

10. The battery-powered information handling system of claim 8, wherein said battery-powered information handling system comprises a notebook computer system; wherein said notebook computer system further comprises said wireless keyboard; wherein said keyboard subsystem circuitry of said wireless keyboard is configured to be removably coupled to form a data communication path between said second smart battery pack of said wireless keyboard and said auxiliary charger controller, said data communication path carrying data to said auxiliary charger controller related to the charge condition of said second smart battery pack, of said keyboard subsystem circuitry of said wireless keyboard.

11. The battery-powered information handling system of claim 10, wherein said auxiliary charger controller is configured to receive said data related to the charge condition of said second smart battery pack of said keyboard subsystem circuitry, and to control said battery interface control circuitry to control flow of charge current from said battery and charging circuitry to said second smart battery pack of said wireless keyboard based at least in part upon said received data related to the charge condition of said second smart battery pack of said keyboard subsystem circuitry.

12. The battery-powered information handling system of claim 11, wherein said auxiliary charger controller is further configured to monitor battery charging operation of said main charger regulator and controller, and to control said battery interface control circuitry to regulate flow of charge current from said main charger regulator and controller to said second smart battery pack of said wireless keyboard based at least in part upon said monitored battery charging operation of said main charger regulator and controller.

13. The battery-powered information handling system of claim 10, wherein said auxiliary charger controller is configured to receive said data related to the charge condition of said second smart battery pack of said keyboard subsystem circuitry; wherein said auxiliary charger controller is configured to monitor battery charging operation of said main charger regulator and controller; and wherein said auxiliary charger controller is further configured to control said battery interface control circuitry to control flow of discharge current from said second smart battery pack of said wireless keyboard to said battery and charging circuitry based at least in part upon said received data related to the charge condition of said second smart battery pack of said keyboard subsystem circuitry find based at least in part upon said monitored battery charging operation of said main charger regulator and controller.

14. The battery-powered information handling system of claim 1, wherein said battery and charging circuitry of said battery-powered information handling system is further configured to be coupled to said second battery pack of said physically separable battery-powered input or input/output device to allow a flow of discharge current from said second battery pack of said physically separable battery-powered input or input/output device to power said system load of said battery-powered information handling system upon loss or failure of said main system battery pack.

15. A method of operating a battery-powered information handling system, comprising:
    providing a battery-powered information handing system that includes a system load, a charger regulator that is configured to produce charge current from a current supply that comprises alternating current or direct current from an AC adapter, and battery and charging circuitry coupled to said charger regulator and configured to provide said charge current to a first battery pack that is a main system battery pack of said battery powered information handling system;
    coupling said battery and charging circuitry of said battery-powered information handling system to a second battery pack that is a battery pack of a physically separable battery-powered input or input/output device, said battery and charging circuitry including a said first battery pack that is a main battery pack of said battery-powered information handling system; and at least one of:
        allowing a flow of said charge current produced by said charge regulator from said battery and charging circuitry to charge said second battery pack of said physically separable battery-powered input or input/output device, or
        allowing a flow of discharge current from said second battery pack of said physically separable battery-powered input or input/output device to power said system load of said battery- powered information handling system, or
        a combination thereof.

16. The method of claim 15, further comprising allowing a flow of discharge current from said second battery pack of said physically separable battery-powered input or input/output device to power said system load of said battery-powered information handling system upon loss or failure of said main system battery pack.

17. The method of claim 15, wherein said method comprises at least one of:
    allowing flow of charge current from said battery and charging circuitry to said second battery pack of said battery-powered input or input/output device of substantially unaltered voltage from the voltage of a charge current provided to said main system battery pack by said battery and charging circuitry,
    allowing flow of discharge current flew from said second battery pack of said battery-powered input or input/output device to power said system load of said battery-powered information handling system of substantially unaltered voltage from a discharge current flow from said main system battery pack, or
    a combination thereof.

18. The method of claim 15, wherein said battery-powered input or input/output device comprises a battery-powered wireless keyboard; and wherein said battery-powered information handling system comprises a notebook computer.

19. The method of claim 15, wherein said method comprises allowing a flow of said charge current produced by said charge regulator from said battery and charging circuitry to charge said second battery pack of said physically separable battery-powered input or input/output device.

20. The method of claim 15, wherein said method further comprises allowing a flow of discharge current from said second battery pack of said physically separable battery-powered input or input/output device to power said system load of said battery-powered information handling system.

21. The method of claim 19, wherein said second battery pack of said physically separable battery-powered input or input/output device comprises a smart battery pack; and wherein said method further comprises monitoring a charge condition of said second battery pack of said physically separable battery-powered input or input/output device, and controlling flow of charge current from said battery and charging circuitry to said second battery pack of said physically separable battery-powered input or input/output device based at least in part upon said monitored charge condition of said second battery pack of said physically separable battery-powered input or input/output device.

22. The method of claim 20, further comprising monitoring battery charging operation of said battery and charging circuitry, and controlling flow of discharge current from said second battery pack of said physically separable battery-powered input or input/output device to said battery and charging circuitry based at least in part upon said monitored battery charging operation of said battery and charging circuitry.

23. A battery-powered information handling system, comprising:
    battery and charging circuitry configured to provide charge current to a first battery pack that is a main system battery pack of said battery powered information handling system;
    wherein said battery and charging circuitry of said battery-powered information handling system is configured to be coupled to a second battery pack that is a battery pack of a physically separable battery-powered input or input/output device to allow a flow of current between said battery and charging circuitry and said second battery pack of said physically separable battery-powered input or input/output device; and
    wherein said current flow between said battery and charging circuitry and said second battery pack of said battery-powered input or input/output device comprises at least one of:
        charge current flow from said battery and charging circuitry to said second battery pack of said battery-powered input or input/output device of substantially unaltered voltage from the voltage of said charge current provided to said main system battery pack by said battery and charging circuitry, discharge current flow from said second battery pack of said battery-powered input or input/output device to said battery and charging circuitry of substantially unaltered voltage from a discharge current flow from said main system battery pack, or a combination thereof.

24. The battery-powered information handling system of claim 23, wherein said current flow between said battery and charging circuitry and said second battery pack of said battery-powered input or input/output device comprises discharge current flow from said battery pack of said battery-powered input or input/output device to said battery and charging circuitry of substantially unaltered voltage from a discharge current flow from said main system battery pack.

25. The battery-powered information handling system of claim 23, wherein said current flow between said battery and charging circuitry and said second battery pack of said battery-powered input or input/output device comprises charge current flow from said battery and charging circuitry to said second battery pack of said battery-powered input or input/output device of substantially unaltered voltage from the voltage of said charge current provided to said main system battery pack by said battery and charging circuitry.

26. A method of operating a battery-powered information handling system, comprising:

coupling battery and charging circuitry of said battery-powered information handling system to a second battery pack that is a battery pack of a physically separable battery-powered input or input/output device, said battery and charging circuitry including a first battery pack that is a main battery pack of said battery-powered information handling system; and allowing a flow of current between said battery and charging circuitry and said second battery pack of said physically separable battery-powered input or input/output device;

wherein said method comprises at least one of:

allowing flow of charge current from said battery and charging circuitry to said second battery pack of said battery-powered input or input/output device of substantially unaltered voltage from the voltage of a charge current provided to said main system battery pack by said battery and charging circuitry, allowing flow of discharge current flow from said second battery pack of said battery-powered input or input/output device to said battery. and charging circuitry of substantially unaltered voltage from a discharge current flow from said main system battery pack, or a combination thereof.

27. The method of claim 26, wherein said method comprises allowing flow of discharge current flow from said second battery pack of said battery-powered input or input/output device to said battery and charging circuitry of substantially unaltered voltage from a discharge current flow from said main system battery pack.

28. The method of claim 26, wherein said method comprises allowing flow of charge current from said battery and charging circuitry to said second battery pack of said battery-powered input or input/output device of substantially unaltered voltage from the voltage of a charge current provided to said main system battery pack by said battery and charging circuitry.

* * * * *